UNITED STATES PATENT OFFICE.

JONAS W. AYLSWORTH, DECEASED, LATE OF EAST ORANGE, NEW JERSEY, BY ADELAIDE M. AYLSWORTH, OF EAST ORANGE, NEW JERSEY, AND SAVINGS INVESTMENT AND TRUST COMPANY OF EAST ORANGE, EXECUTORS.

PRODUCTION OF BENZENE SULFONIC ACID AND ALKALI BENZENE SULFONATE.

1,260,852. Specification of Letters Patent. Patented Mar. 26, 1918.

No Drawing. Original application filed January 24, 1916, Serial No. 73,826. Divided and this application filed January 23, 1917. Serial No. 143,917.

*To all whom it may concern:*

Be it known that we, ADELAIDE M. AYLSWORTH, a citizen of the United States, residing at East Orange, in the county of Essex and State of New Jersey, and SAVINGS INVESTMENT AND TRUST COMPANY OF EAST ORANGE, a corporation of New Jersey, executors of the last will and testament of JONAS W. AYLSWORTH, deceased, late a citizen of the United States, residing at East Orange, in the county of Essex and State of New Jersey, apply as such executors for Letters Patent for certain new and useful Improvements in the Production of Benzene Sulfonic Acid and Alkali Benzene Sulfonate invented by said JONAS W. AYLSWORTH, deceased, of which the following is a specification.

The present invention comprises improved processes for producing benzene sulfonic acid and for producing therefrom alkali benzene sulfonate. The objects of the invention are to produce such substances in an economical and efficient manner. The present application is a division of an application Serial No. 73,826, production of phenol and other substances, filed January 24, 1916, by the said Jonas W. Aylsworth.

The said application described processes for producing phenol synthetically from benzene and in connection therewith described a process for producing benzene sulfonic acid as an intermediate product. In previous processes for producing benzene sulfonate of an alkali, there has been considerable waste of acids and alkali used in such production, and the alkali benzene sulfonate has been prepared in a pure dry state to enable it to be fused with a large excess of caustic alkali, in order to produce sodium or potassium phenoxid, and the operation of thus preparing the compound in the pure dry state has been an expensive one. By the present invention, waste of acid in preparing the benzene sulfonic acid is largely eliminated and the benzene sulfonic acid when produced is converted into its sodium salt by dissolving the acid in water and adding thereto an alkali solution, the alkali being recovered from the succeeding operations.

In the process described, an excess of benzene with concentrated sulfuric acid is heated at progressively increasing temperatures in a closed apparatus. This may be of cast or wrought iron made strong enough to withstand the pressure of benzene vapors at temperatures up to 130° C. This apparatus is provided with means for rapid stirring. After admission of the acid and benzene, the apparatus is closed and the temperature maintained at about 70° C. during the first two hours, 80° C. during the second two hours, 90° C. during the third two hours, 100° C. during the fourth two hours and 120° C. during the ninth and tenth hours. The mass is then allowed to cool below 70° C. and sulfuric anhydrid is slowly added while stirring, the amount being sufficient to convert the water in the mass to sulfuric acid. The water is formed by the reaction between sulfuric acid and benzene, and limits the reaction by diluting the sulfuric acid to a point where it is no longer effective. After thus strengthening the sulfuric acid, the reaction between the latter and the benzene is continued in the closed vessel by heating for several hours additional at a temperature from the normal boiling point of benzene to 120° C. The addition of sulfuric anhydrid and subsequent heating may be repeated if necessary, and the percentage of free sulfuric acid at the end of the operation will be very small. It is desirable to conduct the heating last mentioned at a temperature above the normal boiling point of benzene, for the reason that the sulfuric acid, weakened by the water of reaction, will combine with much more benzene at such temperatures than is the case when the temperature is at or below that of boiling benzene. By the usual method of forming benzene sulfonic acid in which sulfuric acid is used, the percentage of free acid at the end of the operation is very large, and when sulfuric anhydrid or acid containing $SO_3$ is used to react initially with the benzene, a certain amount of benzene disulfonate is liable to form, and this acts as a wasteful impurity.

The benzene sulfonic acid having been produced, it is dissolved in water in a lead lined tank and converted into its sodium salt by adding sodium sulfite solution, the latter being recovered from the succeeding operations. Or other alkali such as soda ash may be used if desired.

What we claim is:—

1. In the manufacture of benzene sulfonic acid, the steps of heating an excess of benzene with sulfuric acid at progressively increasing temperatures in a closed vessel, cooling the mass and adding sulfuric anhydrid while stirring, in amount sufficient to convert the water in the mass to sulfuric acid, and again heating the mass progressively, in a closed vessel to a temperature above the normal boiling point of benzene, to form benzene sulfonic acid, substantially as set forth.

2. In the manufacture of benzene sulfonic acid, the steps of heating an excess of benzene with sulfuric acid, in a closed apparatus, at progressively increasing temperatures, the temperature being first maintained at approximately 70° C., and brought to approximately 120° C. after a number of hours, then cooling the mass to below 70° C., and adding sulfuric anhydrid while stirring, in amount sufficient to convert the water in the mass to sulfuric acid, and continuing the reaction between the sulfuric acid and the benzene in the closed vessel, substantially as set forth.

3. In the manufacture of benzene sulfonic acid, the steps of heating an excess of benzene with sulfuric acid, in a closed apparatus, at progressively increasing temperatures, for several hours, then cooling the mass below 70° C., adding sulfuric anhydrid in amount sufficient to convert the water of reaction to sulfuric acid, and continuing the reaction by heating for several hours at a temperature between the normal boiling point of benzene and 120° C., and repeating the addition of sulfuric anhydrid and subsequent heating, if necessary, substantially as set forth.

This specification signed and witnessed this 20th day of January, 1917.

ADELAIDE M. AYLSWORTH,
SAVINGS INVESTMENT & TRUST CO.
　　　　　　OF EAST ORANGE,
　　*Executors of Jonas W. Aylsworth, deceased.*
DAVID BRIGHAM,
　　*President.*

Witness:
　HARRY H. THOMAS,
　　　　*Secretary.*
Witness as to Adelaide M. Aylsworth:
　STANLEY L. GEDNEY, Jr.